April 5, 1932.  A. F. ARCIER  1,852,099
AIRCRAFT LANDING GEAR
Filed June 1, 1931   3 Sheets-Sheet 1

Inventor
A. F. Arcier
By Maréchal + Noé
Attorney

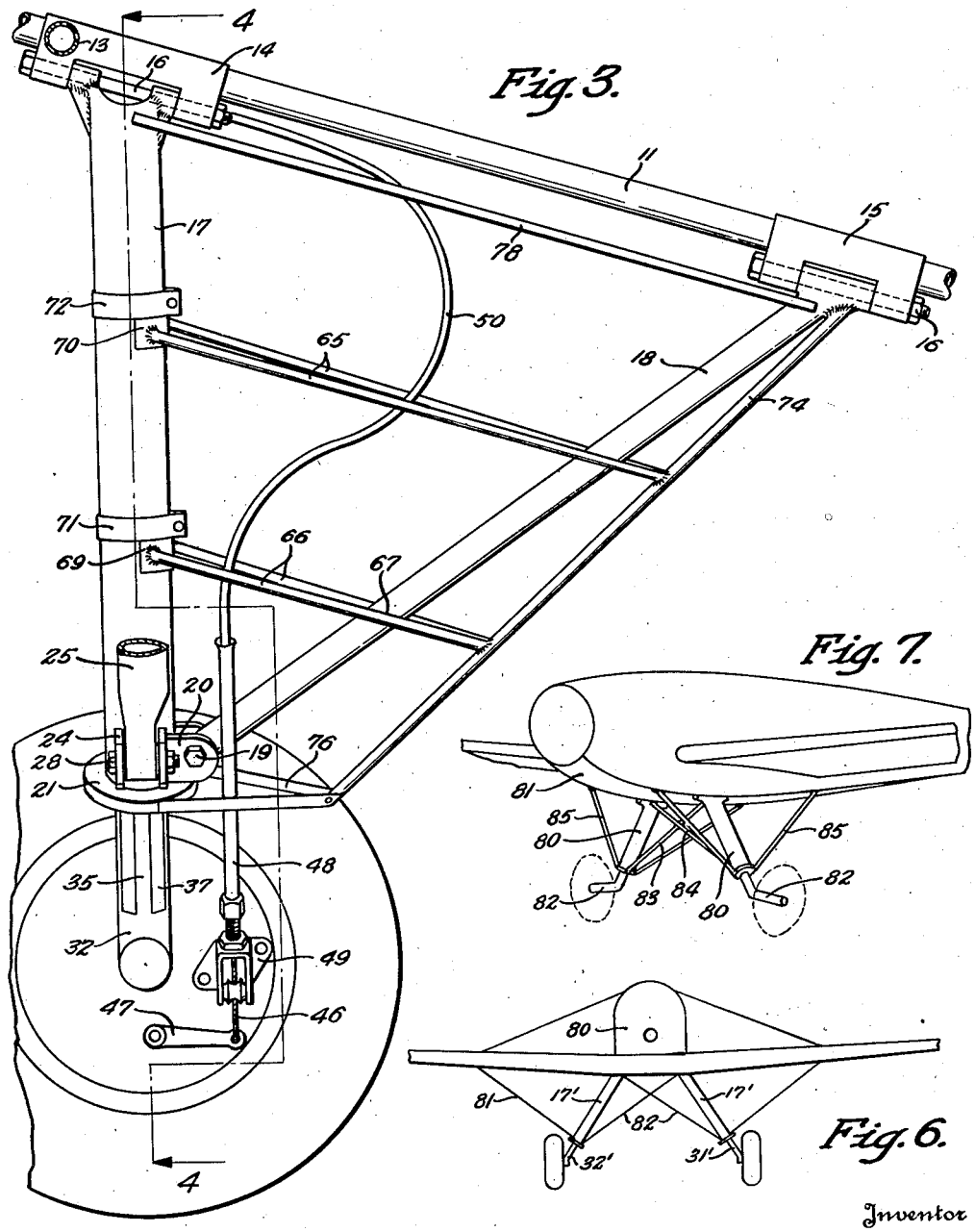

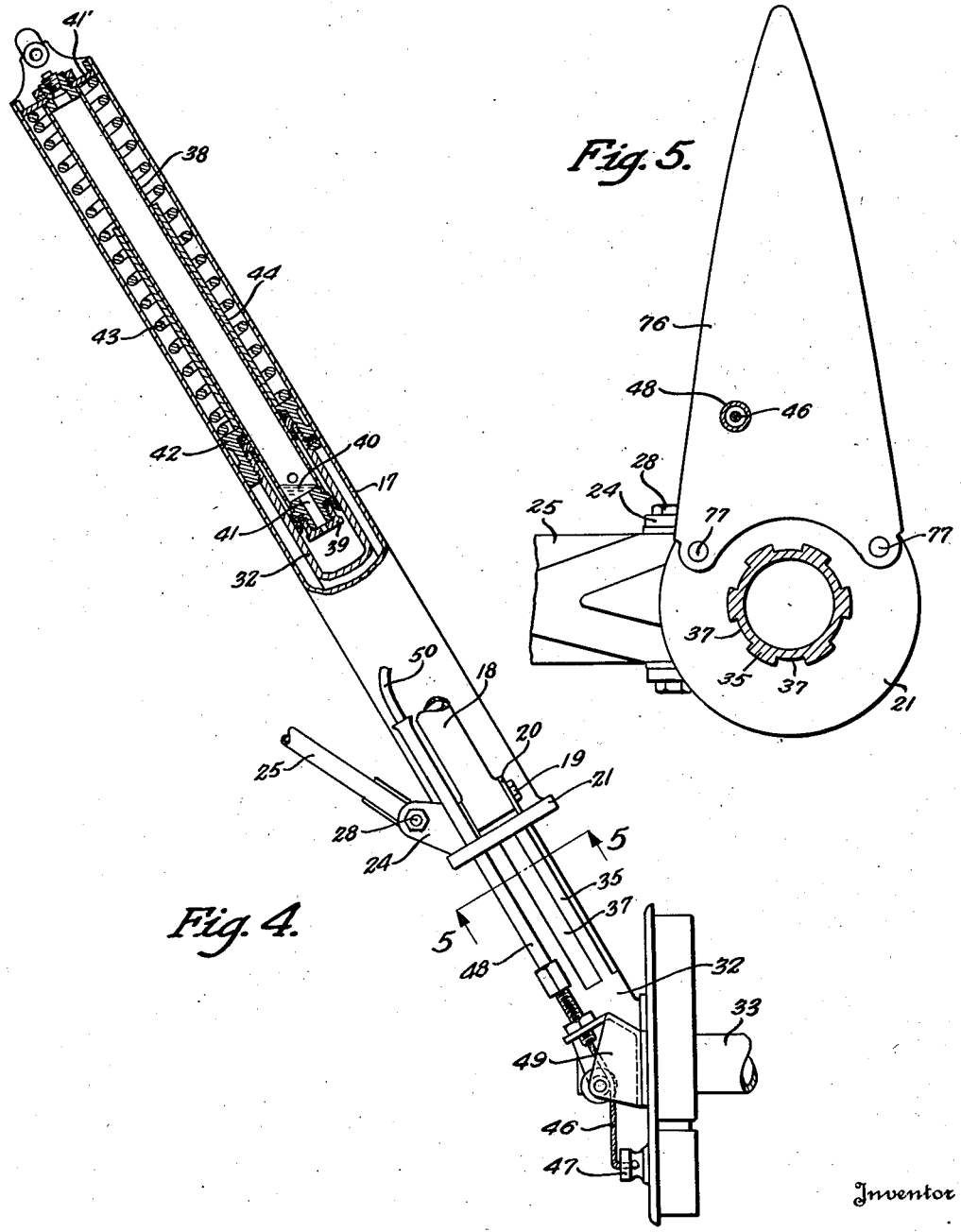

Patented Apr. 5, 1932

1,852,099

UNITED STATES PATENT OFFICE

ALEX FRANCIS ARCIER, OF DAYTON, OHIO, ASSIGNOR TO THE WACO AIRCRAFT COMPANY, OF TROY, OHIO, A CORPORATION OF OHIO

AIRCRAFT LANDING GEAR

Application filed June 1, 1931. Serial No. 541,182.

This invention relates to landing gear for aircraft.

One object of the invention is the provision of an aircraft landing gear having individually supported ground engaging members yieldingly supported for bodily movement in straight lines on fixed inverted pyramidal structures depending from the aircraft.

Another object of the invention is the provision of a landing gear of the character mentioned that may be readily assembled from pieces that are comparatively flat so that the parts of the landing gear may be of minimum bulk to facilitate shipment.

Another object of the invention is the provision of a landing gear of the character mentioned in which the wheels are supported for bodily rectilinear movement along axes which, when extended, intersect the tread portion of the wheel engaging the ground so that turning tendencies of the wheel about upwardly extending axes are obviated.

A further object is the provision of a landing gear having a movably supported shock absorbing landing gear member provided with brake operating mechanism of novel character.

Other objects and advantages of the invention will be apparent from the following description, the appended claims, and the accompanying drawings, in which—

Fig. 3 is a side view of the landing gear along line 3—3 of Fig. 2;

Fig. 4 is a rear elevation, partly in section, of the wheel supporting member and the shock absorbing strut;

Fig. 5 is a section on the line 5—5 of Fig. 4; and

Figs. 6 and 7 are front elevation and perspective views respectively, showing modified forms of construction.

Figure 1:
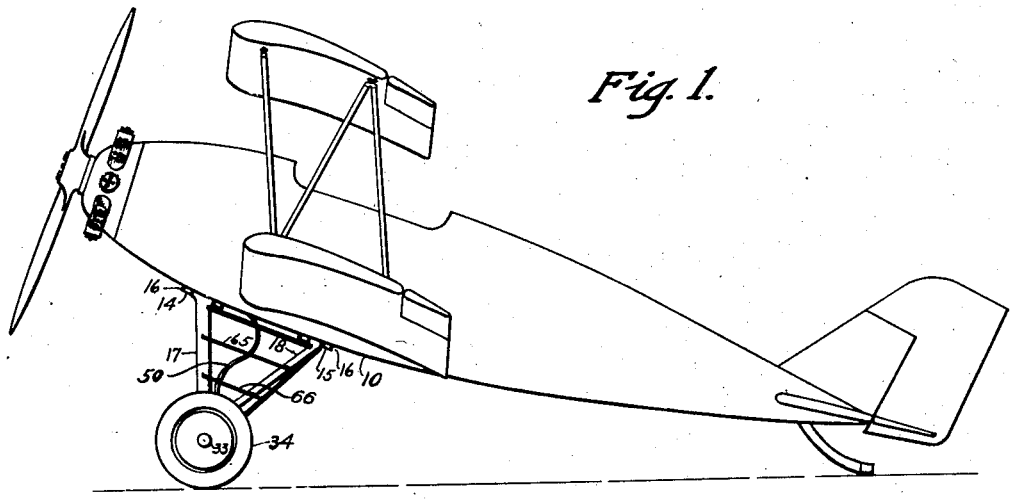
Fig. 1 is a side elevation of an aircraft having a landing gear embodying the present invention.

Referring more particularly to the drawings by reference numerals, like numerals designating similar parts in the various views, 10 designates generally the body or fuselage frame of an aircraft. This frame is preferably a rigid skeleton member formed of welded steel tubing or the like and embodies the two lower longéron tubes 11 and 12 which are interconnected and braced by suitable transverse tubes 13 welded or otherwise fixed thereto.

At longitudinally spaced points along the longérons 11 and 12 are bracket clips 14 and 15, preferably welded directly to the longérons. Each bracket clip is adapted to receive a hinge pin or bolt 16, the bolts extending through longitudinal passages in the upper ends of downwardly extending struts 17 and 18. These struts are preferably hollow steel tubes, and are arranged in pairs, as shown, in V-formation as viewed from the side of the aircraft. The lower end of each of the struts 17 is connected by a transverse bolt 19 and lugs 20 to the lower end of a strut 18. The bolts 19 are adapted to be readily removable, and the same is true of the pins or bolts 16 which connect the upper ends of the struts to the fuselage longérons.

The struts 17 and 18 extend downwardly and outwardly at a suitable inclination, the two pairs of V-arranged struts being held firmly in their proper attitude by means of diagonal tie members. Where the struts 17 and 18 are pivotally supported at their upper ends the diagonal tie members are preferably rigid hollow tubes 25 and 26, although wires may be used if the tops of the struts mentioned are connected solidly to the fuselage. The lower ends of these tubes 25 and 26 are flattened and provided with bolt holes so that they may be fixed to the lower ends of the struts 17 by means of bolts 28 which extend through lugs 24 provided just above the flanges 21 which are provided on the lower ends of the struts 17. The upper ends of the tie members 25 and 26 are bent horizontally and are adapted to be secured in fixed position by suitable bolts 30 that pass downwardly through the cross tube 13 of the fuselage, extending preferably through the clips 14 to which the struts 17 are attached. Where the two cross ties 25 and 26 cross one another they are preferably arranged in a common transverse plane, the tie member 26 for example being continuous while the tie member 25 is formed of two axially aligned portions welded to the member 26, the joint being strengthened by a tie plate 30' which is welded to the intersecting portions of all of these parts. It will be noted that the cross tie member formed of the tubes 25 and 26 is a comparatively flat member requiring little bulk or space in shipment, and the same is true of the individual struts 17, and 18. These parts can be quickly and readily assembled by a few attaching bolts or the like so as to provide two downwardly extending inverted pyramids of rigid construction adapted for the support of the two landing members which will be herein referred to as wheels, although obviously the equivalent skids or other form of ground engaging members may be used in place of the wheels herein shown and referred to.

The two wheels are rotatably mounted on two independent wheel supporting members 31 and 32, and as the construction of these two members is of course the same, a description of the wheel supporting member 32 only will be necessary. This wheel supporting member 32 has an axle supporting portion 33 in which the wheel axle is mounted. Rigid with the axle supporting portion 33, and preferably welded thereto, is an upwardly extending end portion 35 which is bodily movable in an axial direction only, in the inverted pyramid support formed of the struts 17, 18 and 25. The upwardly extending end portion 35 of the wheel supporting member is movable longitudinally of the strut 17, and is preferably telescopically received in the lower portion of this strut and prevented from turning therein. As here shown, the end portion 35 referred to is provided with splined grooves 37 cooperating with complementary splined portions provided inside the flange member 21 on the lower end of the tube 17. Thus the wheel and the wheel supporting member are prevented from swinging about an upwardly extending axis and the axle supporting portion 33 is maintained in its normal horizontal position providing for proper camber and tow-in of the wheel.

Upward movement of the wheel supporting member is controlled by a suitable shock absorbing device which may be of any suitable type, but which is preferably of the "squash" or "oleo" type, as shown in Fig. 4. The strut tube 17 encloses a piston supporting tube 38 on the lower end of which is a piston element 39 having a close fit within the cylindrical bore of the wheel supporting member 32. The tube 38 and member 32 are partly filled with oil or other suitable liquid as indicated at 40. This liquid is adapted to pass through an opening 41 of limited size as the wheel supporting member moves upwardly with respect to the piston member. The upper end of the tube 38 is secured to a plate 41' welded in the top of the strut tube 17. On the upper end of the wheel supporting member 32 is a threaded slide element 42 adapted to slide along the outer side of the tube 38 and along the inside of the strut tube 17. Within the chamber provided between tubes 38 and 17 is a compression spring 43, and a tube 44 that limits the collapsing movement of the shock absorber. After taking off, the weight of the landing wheels forces the wheel supporting members downwardly to return them to a position ready for landing.

Each of the wheels of the aircraft is preferably provided with a brake adapted to be controlled by the pilot. The brakes are operated by suitable flexible connections extending from the brake control lever in the aircraft to the brake operating elements on the wheel supporting members. A wire 46 extends to and operates lever 47 which is connected to the brake operating cam. The wire extends up through a rigid tube 48 that is slidably guided in a plate 76 fixed on the flange 21 of the shock absorbing strut. The lower end of the tube is fixed by means of a suitable connection 49 to the lower end of the wheel supporting member so that the tube will be moved up and down in accordance with the movements of the wheel. The tube 48 encloses a flexible tubular casing or housing 50, the lower end of which is fixed to the bottom of tube 48. This housing 50 projects up out of the tube 48 adjacent the struts 17 and 18 and curves in the form of a loop, being shown projecting forwardly into the fuselage adjacent the hinge connection of the strut 17. In this way the movements of the wheel are transmitted to the tube 48, which is of course arranged parallel to the axis of the shock absorbing strut, and the loop formation of the flexible housing 50 prevents any sharp bends in the wire 46.

Figure 2:
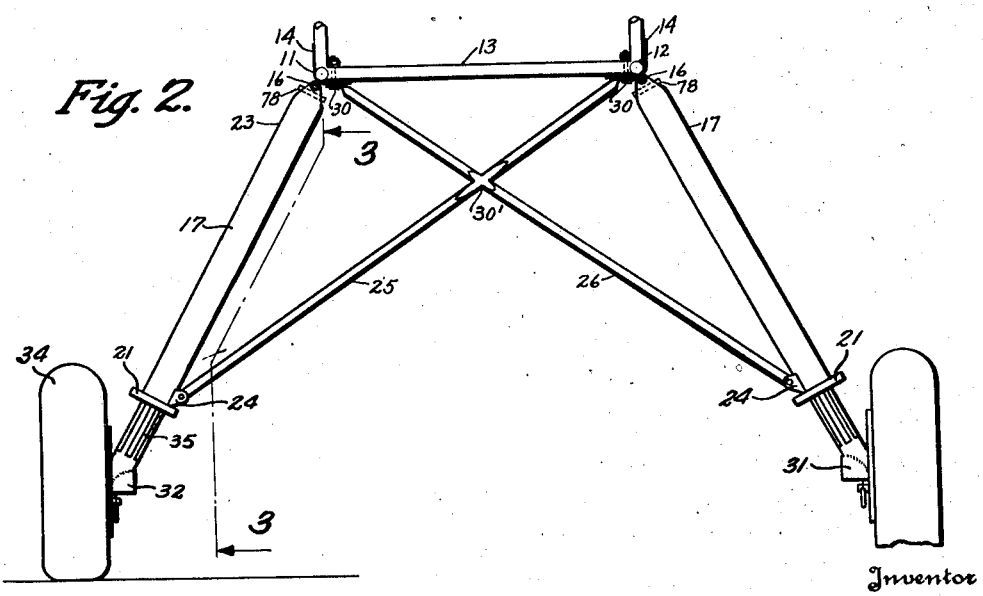
Fig. 2 is a front elevation of a portion of the landing gear.

As will be apparent from Figs. 1 and 2, the shock absorbing strut 17 is arranged laterally at an inclined angle, but extends in a vertical transverse plane when the aircraft is in landing attitude with its tail skid touching the ground. The shock of landing is thus absorbed always entirely in a transverse plane containing the strut 17, and the rearwardly extending strut 18 need not be unusually heavy or rugged in construction. The strut 17 is so arranged with respect to the wheel that the strut axis when extended intersects the bottom of the wheel where it is in contact with the ground so that the turning tendencies of the wheel about the axis of the member 35 is practically negligible and the splined portions of the telescopic members 35 and 21 are not called upon to resist very great swinging or turning forces at the time of landing. While taking off, the tail of the aircraft is elevated and the strut 17 as viewed from the side is inclined downwardly and rearwardly, but under such conditions the load imposed on the landing gear is very much smaller than the load imposed during landing, and can be readily taken care of.

Each pair of struts 17 and 18 are preferably streamlined together, to reduce wind resistance. This stream-lining, which may be sheets of fabric or metal applied to the sides of the struts and stretching from one strut to the other, is preferably applied to a frame work embodying the longitudinally extending strips 65 and 66, preferably small metal strips welded to the strut 18 as indicated at 67, and welded at their forward ends to U-shaped members 69 and 70 which are fixed to the strut 17 by circumferentially extending fastening straps 71 and 72 in a readily detachable manner. The strips 65 and 66 preferably extend to the rear of the strut 18 and are welded to a small terminal bar or tube 74 which is located to the rear of the strut 18. The upper end of the terminal bar 74 is welded to the top of the strut 18, and the lower end thereof is spaced a suitable distance from the strut by means of the sheet metal plate 76 which is preferably secured to the bottom of the flange 21 by means of bolts 77. Between the upper ends of the struts 17 and 18 there may be a longitudinally extending strip 78, the ends of which are socketed so as to partly encircle the top portions of the struts. These parts 78, 65, 66 and 74 form attachment means to which the stream-lining cover may be readily applied. The stream-lining cover of course encloses the parts of the brake operating tube and casing that are above the flange 21.

It will now be apparent that the wheels of the aircraft are supported for bodily movement in a manner so that their tow-in and camber is constant, as they move bodily in straight lines and the direction in which the wheel supporting axles extend cannot vary. The load imposed on the various parts is thus assumed in the most direct manner without creating undue bending forces or turning forces, and as the line of application of force coincides with the axis of the strut 17, these bending and turning forces are rendered negligible so that the parts may be of comparatively light weight and yet strong enough to withstand the loads imposed on them in a very satisfactory manner. The parts of the landing gear can readily be disassembled and assembled, and are formed of separate members which are flat and therefore can be readily shipped without requiring unusual space in shipment. The pinned or hinged connections between the upper ends of the struts 17 and 18 and the fuselage, and the bolt connection between these two struts at their lower ends form very simple connections even though the struts 17 and 18 and the inclined tie member or members are rigidly interconnected together to provide a rigid inverted pyramid. When thus connected no motion is possible in any of the joints or pivot connections which are therefore not subjected to wear and which will not, after a period of use, become noisy.

The construction shown in Fig. 6 employs wires as a means for fixing the two pairs of downwardly converging struts in definite position, these struts serving as king posts for strengthening the plane structure. The two front struts 17' are inclined downwardly and outwardly and movably support the wheel supporting members 31', 32' in the same manner as in the construction of Figs. 1 to 5. The upper ends of the struts 17' are either pivoted or securely fixed to the lower side of the wing or body 80 and are braced securely by the wires 81 and cross wires 82 which extend from a bottom portion of the struts 17'. The wires 81 may diverge from their point of attachment to struts 17' and connect to the wing spurs at points well out on the wings. Such an arrangement is particularly desirable for high speed monoplanes.

Fig. 7 shows another modified form of construction, in which the main shock absorbing struts 80 are pivotally connected at their upper ends to the fuselage 81, and support the wheel supporting members 82 in the same manner as in the form of construction first described. The struts 80 are braced laterally by the crossed tie rods or tubes 83, 84 corresponding to the diagonal tie members 25 and 26. Tie rods 85 which are secured by suitable attaching bolts and which are provided in front and to the rear of the struts 80 hold the latter securely against any longitudinal movement. The parts 80, 83, 84 and 85 thus form two rigid inverted pyramids depending from the fuselage, by which the wheels are movably supported.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft, a body, V-arranged landing gear struts of fixed length depending from each side of the body, diagonal tie members of fixed length fixed to the body and fixed to the lower ends of said struts, and a separate wheel supporting member on each side of the body each having an upwardly extending end slidably guided by said struts providing for individual mounting of each wheel supporting member for bodily movement in a straight line.

2. In an aircraft, a body, rigid V-arranged landing gear struts depending from each side of the body, a strut of fixed length laterally inclined to said V-arranged struts and fixed to the body and to the lower ends of said V-arranged struts to provide two rigid inverted pyramids, and separate wheel supporting members each having an upwardly extending end slidably guided by said struts providing for individual mounting of each wheel supporting member for bodily movement in a straight line.

3. In an aircraft, a body, V-arranged landing gear struts of fixed length depending from each side of the body, a strut of fixed length laterally inclined to said V-arranged struts and fixed to the body and to the lower ends of said V-arranged struts to provide two rigid inverted pyramids, separate wheel supporting members each having an upwardly extending end slidably received in one of said struts and providing for individual mounting of said wheel supporting members for bodily rectilinear movement, and means controlling upward movement of the upwardly extending ends of the wheel supporting members.

4. In an aircraft, a body, V-arranged landing gear struts depending from each side of the body, laterally inclined tie means fixed to the body and to the lower ends of said V-arranged struts, a separate wheel supporting member on each side of the body each having an upwardly extending end slidably guided by said struts and held therein against any swinging movement, and means controlling upward movement of said upwardly extending ends.

5. In an aircraft, a body, V-arranged landing gear struts depending from each side of the body, laterally inclined tie means fixed to the body and to the lower ends of said V-arranged struts, and a separate wheel supporting member on each side of the body each having an upwardly extending end slidably guided by said struts and held therein against any swinging movement, the longitudinal axis of said upwardly extending end lying in a vertical plane when the aircraft is in landing attitude.

6. An aircraft landing gear comprising a wheel supporting member having an upwardly extending end, a chassis frame movably supporting said member for rectilinear movement and comprising interconnecting downwardly converging struts arranged in V-formation as viewed from both the front and the side, and having provision for guiding the end of said member axially and for preventing any swinging movement of said member.

7. An aircraft landing gear comprising a wheel supporting member having an upwardly extending end, a chassis frame movably supporting said member for rectilinear movement and comprising interconnecting downwardly converging struts arranged in V-formation as viewed from both the front and the side, and having provision for guiding the end of said member axially and for preventing any swinging movement of said member, the longitudinal axis of said upwardly extending end intersecting the wheel tread in contact with the ground when the aircraft is in landing attitude.

8. In an aircraft, a body, landing gear struts of fixed length fixed together at their lower ends and to the body at their upper ends and providing a rigid fixed inverted pyramid, a wheel supporting member having a horizontal axle portion and an upwardly extending end portion rigid therewith and guided for endwise movement in said pyramid, and means controlling upward movement of said upwardly extending end portion.

9. In an aircraft, a body, landing gear struts of fixed length fixed together at their lower ends and to the body at their upper ends and providing a rigid fixed inverted pyramid, a wheel supporting member having a horizontal axle portion and an upwardly extending end portion rigid therewith telescopically guided in one of said struts, means preventing swinging movement of said end portion about the axis of said strut, and shock absorbing means for controlling upward movements of said wheel supporting member.

10. In an aircraft, a body, rigid V-arranged landing struts depending from each side of the body and pivotally connected thereto at the upper ends of said struts, means detachably connecting the lower ends of said struts together, laterally inclined strength members detachably connected at their upper and lower ends to the body and to a bottom portion of one of said struts respectively, said V-arranged struts and said strength members providing two inverted pyramids the sides of which are all of definite length, a wheel supporting member on each side of the body having an upwardly extending end, and means guiding said upwardly extending ends for movement longitudinally of a strut providing for bodily movements of the wheel axles in straight lines.

11. In an aircraft, a body, a pair of V-arranged struts connected to longitudinally spaced points on the body and connected together at their lower ends, a tie member extending from the opposite side of the body and detachably fixed to the lower ends of said struts, a wheel supporting member having an upwardly extending portion arranged longitudinally of one of said struts for endwise movement, said extending end and the strut along which it extends having cooperating means preventing rotational movements of the wheel supporting member about its own axis.

12. In an aircraft, a body, a pair of V- arranged struts connected to longitudinally spaced points on the body and connected together at their lower ends, means laterally positioning the lower ends of said struts, and a wheel supporting member having an upwardly extending portion arranged longitudinally of one of said struts for endwise movement, said extending end and the strut along which it extends having cooperating means preventing rotational movements of the wheel supporting member about its own axis.

13. In an aircraft, a body, V-arranged landing gear struts of fixed length depending from each side of the body, diagonal tie members of fixed length fixed to the body and fixed to the lower ends of said struts, a separate wheel supporting member on each side of the body each having an upwardly extending end slidably guided by said struts providing for individual mounting of each wheel supporting member for bodily movement in a straight line, a tube slidably supported by the lower ends of said struts and fixed to said wheel supporting member, and controllable brake operating means in said tube.

14. In an aircraft, a body, V-arranged landing gear struts depending from each side of the body, laterally inclined tie means fixed to the body and to the lower ends of said V-arranged struts, a separate wheel supporting member on each side of the body each having an upwardly extending end movably supported by said struts, means controlling upward movement of said upwardly extending ends, a rigid tube slidably supported by the lower ends of said struts and fixed to said wheel supporting member, and brake operating power transmitting means in said tube.

15. An aircraft landing gear comprising a wheel supporting member having an upwardly extending end, a chassis frame movably supporting said member for rectilinear movement and comprising interconnecting downwardly converging struts arranged in V-formation as viewed from the front, and having provision for guiding the end of said member axially and for preventing any swinging movement of said member, a rigid guide member slidably supported by the lower ends of said struts and connected to said wheel supporting member, and brake operating means extending through said guide member.

16. In an aircraft, a body, a pair of V-arranged struts connected to longitudinally spaced points on the body and connected together at their lower ends, means laterally positioning the lower ends of said struts, a wheel supporting member having an upwardly extending portion arranged longitudinally of one of said struts for endwise movement, said extending end and the strut along which it extends having cooperating means preventing rotational movements of the wheel supporting member about its own axis, means controlling endwise movement of said extending portion, and brake operating means comprising a tube slidably guided by said struts, means fixing the lower end of said tube for movement with said axle member, and controllable brake operating means in said tube.

17. In an aircraft, a body, a landing gear strut projecting downwardly therefrom, means connecting the lower end of said strut to the body and securing it in fixed position, a wheel supporting member having an upwardly extending end in telescopic engagement with said strut, means controlling relative upward movement of said end, a brake operating element on said wheel supporting member, a rigid tube slidably guided by the lower end of said strut and fixed to the wheel supporting member, operating means extending through said tube and connected to said element, and flexible means extending up out of said tube and enclosing said operating means.

In testimony whereof I hereto affix my signature.

ALEX FRANCIS ARCIER.